United States Patent [19]
Cobern

[11] Patent Number: 4,716,973
[45] Date of Patent: Jan. 5, 1988

[54] METHOD FOR EVALUATION OF FORMATION INVASION AND FORMATION PERMEABILITY

[75] Inventor: Martin E. Cobern, Cheshire, Conn.

[73] Assignee: Teleco Oilfield Services Inc., Meriden, Conn.

[21] Appl. No.: 941,390

[22] Filed: Dec. 15, 1986

Related U.S. Application Data

[63] Continuation of Ser. No. 745,691, Jun. 14, 1985, abandoned.

[51] Int. Cl.$^4$ .............................................. E21B 49/00
[52] U.S. Cl. ........................................ 175/50; 73/155; 166/66; 166/250
[58] Field of Search ................. 166/66, 250; 175/50; 73/155

[56]  References Cited
U.S. PATENT DOCUMENTS

| | | | |
|---|---|---|---|
| 2,917,704 | 12/1959 | Arps | 175/50 X |
| 2,938,708 | 5/1960 | Arps | 175/50 |
| 2,978,634 | 4/1961 | Arps | 175/50 X |
| 3,115,942 | 12/1963 | Arps | 175/50 |
| 3,237,094 | 2/1966 | Blackburn et al. | 166/250 X |
| 3,306,102 | 2/1967 | LeBourg | 73/155 |
| 4,420,975 | 12/1983 | Nagel et al. | 73/155 |

Primary Examiner—George A. Suchfield
Attorney, Agent, or Firm—Fishman & Dionne

[57]  ABSTRACT

A method is presented for evaluation of formation invasion and formation permeability by conducting a series of formation resistivity loggings in the operation of a measurement while drilling (MWD) logging system.

27 Claims, 7 Drawing Figures

METHOD FOR EVALUATION OF FORMATION INVASION AND FORMATION PERMEABILITY

This application is a continuation of application Ser. No. 745,691, filed June 14, 1985, now abandoned.

BACKGROUND OF THE INVENTION

This invention relates to the field of borehole logging. More particularly, this invention relates to a process for evaluating formation invasion and formation permeability through resistivity logging.

The principal objectives of well logging are to identify and correlate underground formations, to determine the minerology and physical properties of potential reservoir rock and the nature of the fluids they contain. Porosity and fluid saturation are of most interest in the estimation of hydrocarbon reserves. Permeability, which is a measure of the resistance of the formation to fluid flow, including invasion, and which is needed to estimate recoverable reserves, has been the most difficult parameter to determine and quantify by borehole surveys.

One of the primary difficulties in formation analysis from borehole surveys is the need to determine and compensate for the effects of invasion. Invasion takes place in porous permeable zones where the hydrostatic/dynamic pressure of the drilling mud is greater than the formation pore pressure. The invasion of the mud filtrate will cause a radial variation of the formation resistivity. Since one objective of most logging methods is to measure the properties of the undisturbed formation, logging tools are usually designed to be insensitive to invasion or compensated for this fluid replacement by means of departure curves. In the prior art, this is normally done by running wireline resistivity logs which have different response functions, or depths of investigation (i.e., spherically focused (or short-normal) logs, medium induction logs, and deep induction logs). From these measurements, invasion corrections can be derived. (See, for example, Dresser-Atlas, *Log Interpretation Charts*, (1979)). More recently, a different approach has been used, which is to solve the "forward" problem. In this method, one assumes a lithology, porosity and water saturation (among other parameters) and varies these until a fit is obtained to the suite of wireline logs. (See, for example, the following papers at the SPWLA Twenty-fifth Annual Loging Symposium, New Orleans, June 10–13, 1984. M. A. Yuratich and Walter J. Meger, "The Application of Finite Difference Methods to Normal Resistivity Logs," (Paper V). Mark Alberty and Khaled H. Hashmy, "Application of ULTRA to Log Analysis", (Paper Z). Yih-Yih Lin, Stan Gianzero, and Robert Strickland, "Inversion of Induction Logging Data Using the Least Squares Technique" (Paper AA). However, these wireline methods have serious drawbacks or shortcomings. In either analysis one is looking at "snapshots" of the formation at a particular time (typically many days after drilling), with each measurement having a different response function. These analyses give no information about the time dependence, i.e., the rate, of the invasion process, but are designed only to reconstruct the formation's properties prior to invasion.

These previous methods involve taking a suite of several wireline measurements days or weeks after drilling has occured at a particular depth in a borehole. Because these wireline logs are taken so long after drilling, invasion is often essentially complete and these logs provide no information about the rate of invasion, and, hence, do not provide information about permeability.

Known methods to obtain permeability information include laboratory analyses of core samples and inferences from other suites of wireline logs. These prior methods are cumbersome, time consuming and/or highly unreliable. Indeed, it is often considered to be doing well to get within an order of magnitude of the actual permeability.

SUMMARY OF THE INVENTION

The method of the present invention employs a series of resistivity logs obtained in a measurement while drilling (MWD) system to generate information relating to formation invasion and formation permeability.

The theory of resistivity logging is based on the concept that dry rock is an insulator, and that, therefore, any resistivity in a borehole formation is related to the quantity and type of fluid in the pores of the formation. Thus, for example, since salt water is highly conductive it will cause low resistivity readings; whereas oil, which is a poor conductor, will cause much higher resistivity readings. Since the drilling mud is at a higher pressure than the pressure of the fluids in the formation, it tends to displace the connate fluids in the formation. This distorts or changes the resistivity readings.

The method of the present invention makes use of the displacement of connate fluids by the drilling mud to generate data by resistivity logging which is commensurate with the rate of formation invasion and formation permeability. In the method of the present invention, first resistivity logs are taken in various zones within minutes after the rock of each zone has been drilled. Subsequent resistivity logs of the zones; i.e., relogs, are taken at intervals when the drill string is being removed from or lowered into the borehole. The data thus generated is then processed to obtain results which are commensurate with formation invasion and permeability.

Since a measurement-while drilling resistivity logging tool is used, formation parameters may be measured within minutes after the bit has drilled the rock. Under these conditions, the effects of invasion will be minimal for the first log. Furthermore, since it is feasible to relog sections of particular interest several times during later drilling operations before the zone becomes flushed, i.e., before equilibrium is established between the pressure of the mud filtrate and the connate fluid. This relogging technique provides what amounts to a "motion picture" of the invasion process. Since all measurements are made with the same tool, it is not necessary to account for different tool response profiles; any differences observed can be directly attributed to the results of the drilling process, i.e., invasion and/or formation damage.

The logging and relogging aspect of the method of the present invention generates data which strikingly illustrates the invasion of drilling fluid into the formation as it occurs; and the analytical aspect of the method of the present invention produces results which provide indications of formation invasion and permeability.

The importance of the present invention is not in the fact of relogging, per se, in an MWD environment. Rather, the importance is in applying the concept of relogging in an MWD environment to a method whereby accurate and reliable permeability information can be generated. It should be noted that the method of the present invention provides what may be considered to be an index of permeability. That is, the method provides a comparative or relative indication of permeability rather than an absolute permeability value. This relative information is of great value in evaluating borehole formations, especially since the information is obtained while drilling and does not rely on laboratory analyses of cores.

The above discussed and other features and advantages of the present invention will be apparent to and understood by those skilled in the art from the following detailed description and drawings.

BRIEF DESCRIPTION OF THE DRAWINGS

Referring now to the drawings.

DESCRIPTION OF THE PREFERRED EMBODIMENT

Figure 1:
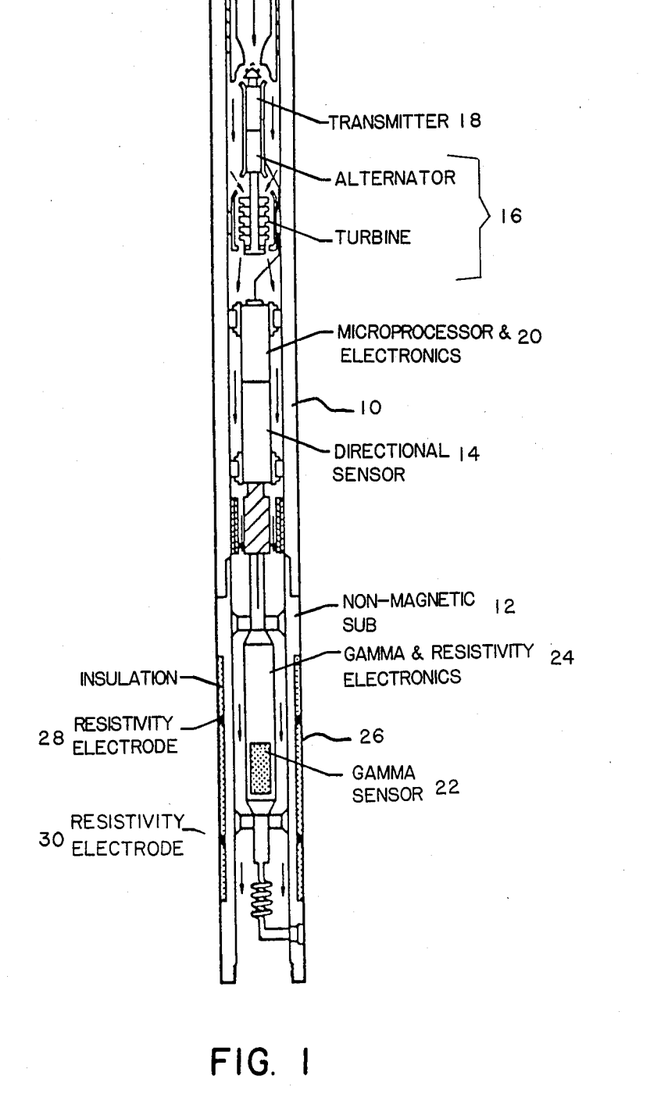
FIG. 1 is a schematic representation of an MWD system for practicing the present invention.

Referring to FIG. 1, apparatus for MWD resistivity logging is schematically illustrated. The apparatus is a resistivity-gamma-directional (RGD) MWD measurement tool presently in commercial use by Teleco Oilfield Service Inc. (assignee of the present invention). The apparatus shown in FIG. 1 is a drill collar having an upper steel section 10 and a lower non-magnetic sub 12, sections 10 and 12 being threaded together, with appropriate electrical interconnections.

As mentioned, the RGD tool of FIG. 1 consists of two sections 10 and 12 and has an overall length of 39 feet. The upper portion 10 of the tool houses Teleco's standard directional sensor 14, turbine/alternator 16, transmitter 18 and microprocessor and electronics 20. The downhole microprocessor 20 processes the logging data and controls the transmission sequence: continuous formation gamma and resistivity data while rotating, directional data while not rotating. The transmitter 18 is a mud pulse transmitter as shown and described in U.S. Pat. Nos. 3,982,431; 4,013,945; and 4,021,774, assigned to the assignee hereof and incorporated herein in their entirety.

An auxiliary sensor module is mounted in sub 12. Located in the center of this unit is the gamma ray detector 22 and an electronics package 24. The collar surface has an insulated region 26 with two electrodes 28 and 30 which operates as a 16 inch short normal resistivity tool. Electrical connection of the resistivity electrodes to electronics 24 may be accomplished in any standard manner known in the art. The geometry of the tool places the measure points of the gamma ray and resistivity sensors at the same depth. This facilitates analysis and allows both measurements to be made in a zone of interest at the same time.

The 16 inch short normal MWD resistivity measurement may, in accordance with conventional practices, be used to:
Correlate with offset well logs
Determine lithology
Define thin beds and bed thickness
Identify potential hydrocarbon-bearing intervals
Determine pore pressure trends The method of the present invention adds another and very important capability to this device.

In accordance with the process of the present invention, a first MWD resistivity log is taken in a borehole in real time and within minutes after a zone is drilled. Thereafter several relogs are taken of one or more zones of interest (which may be determined from the MWD and offset logs). The relogs are taken during subsequent trips of the drill string out of and back down the well or during short trips. The rate of descent of the drill during relogs is controlled to provide the desired bed resolution.

Before further discussion of the analytical method of the present invention, a brief discussion is in order of actual relogging examples performed in wells to test and prove the method.

Real-time MWD gamma and resistivity logs were recorded on two Gulf Coast wells ("Well A" & "Well B"). Both wells are onshore and drilled delta plain sediments consisting of clastic sequences of sands and shales. Structurally, the wells were located close to down-to-the-basin faults commonly found throughout the Gulf of Mexico region.

On the basis of MWD and offset logs, zones were selected from each well for further study. During subsequent trips or short trips, the zones of interest were relogged several times. The rate of descent of the drill string during these relogs was held to approximately 60 feet/hour, resulting in a bed resolution of approximately one foot. While this gave a somewhat less detailed log than was obtained in real time, it was adequate for this analysis.

The selected zones of Well A were logged up to 7 times over a period of 12 days; those of Well B up to 6 times in 7 days. The times are summarized in Table 1. For comparison purposes, wireline logs were run approximately two weeks after the initial drilling of the selected zones.

TABLE 1

Summary of MWD Relog Times

| | Well A | | |
|---|---|---|---|
| Zone | 4955–5065 feet | 6945–7025 Feet | 7935–8015 feet |
| Times (hrs.) | 0* | 0* | 0* |
| | 3 | 3 | 37 |
| | 33 | 8 | 62 |
| | 76 | 39 | |
| | 110 | 104 | |
| | 175 | 136 | |
| | | 300 | |

| | Well B | |
|---|---|---|
| Zone | 7959–7010 Feet | 7180–7220 feet |
| Times (hrs.) | 0* | 0* |
| | 3 | 4 |
| | 28 | 17 |
| | 39 | 73 |
| | 105 | 145 |
| | 136 | |

*Logs taken while drilling; generally within 30 min.

Figure 2:
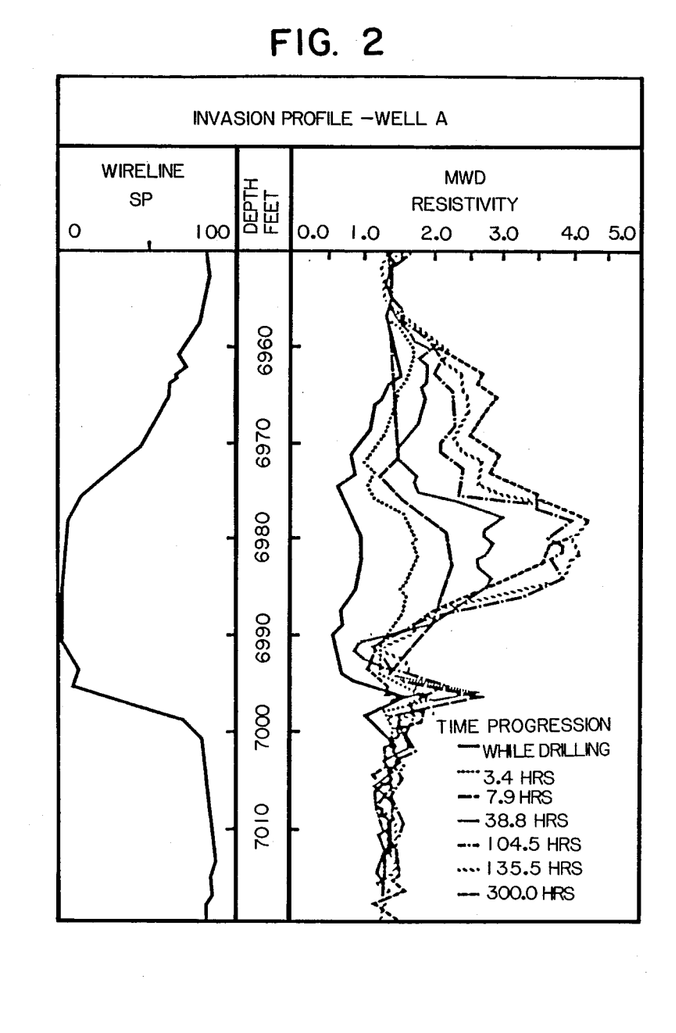
FIGS. 2 and 3 are charts showing fluid invasion profiles for a first borehole obtained using conventional wireline techniques and the MWD logging and relogging of the present invention.

An underlying theory of the method of the present invention is that MWD relogs of a well will provide time dependent data on fluid invasion. The data obtained from Well A proves that theory. In FIG. 2, the data to the right of the depth stations shows resistivity (in ohm-m) for an expanded view of MWD relogs for the depth zone between 6950 and 7120 feet for a series of logs taken over a time period from while drilling to 300 hours after drilling. The data to the left of the depth stations shows spontaneous potential (in millivolts) for a wireline reading of the same zone. The resistivity of the drilling mud (Rm) was approximately 1 ohm-m. In the MWD resistivity graph, the locale where resistivity readings are essentially constant (i.e., above 6960 feet and below 7000 feet) indicate the presence of shale, while the zone between 6960 and 7000 feet where resistivity varies indicates a sand zone. The wireline readings confirm the presence of the sand and shale zones.

Several features stand out prominently in the MWD resistivity data of FIG. 2. The shale resistivities are essentially constant over time. There is a clear evolution in time in the sand zone resistivity. (Note: the formation and mud resistivities in this example were such that the borehole corrections were negligible.) The fact that the resistivity increases with time reflects the freshness of the mud. The mud filtrate resistivity is higher than that of the connate fluids. The properties of the mud and the differential pressure remained approximately the same during the relogs. The resistivity changes rapidly in the period just following drilling, then more slowly. The similarity of the last passes reflects the fact that one the sensor's zone of investigation is essentially flushed or pressure equilibrium has been reached, there will be little further change in the apparent resistivity.

The MWD data in FIG. 2 confirm the theory that MWD relogs provide incremental data, and hence data about the rate of invasion, before a zone is flushed or pressure equilibrium is reached. This important data has not heretofore been available.

Figure 3:
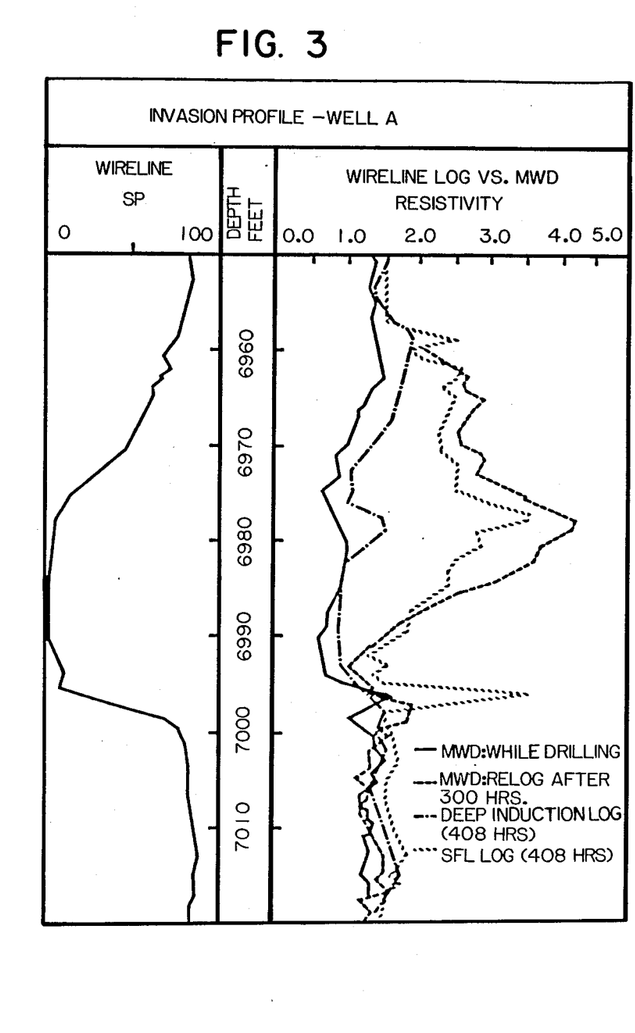

FIG. 3 compares the first (real time, while drilling) and last (300 hours) MWD runs with two wireline resistivity logs, deep induction and spherically focused, run approximately five days after the last MWD relog. This comparison reveals some further interesting and unexpected results. The real-time MWD resistivity in the sand zone is lower than even the deep induction wireline log. This implies that when using a short normal log in an MWD application, the readings may be less influenced by invasion than those of a deep induction tool, and therefore read close to the true resistivity $R_t$. The first MWD resistivity was measured at about 5 minutes after drilling, during which time the formation was exposed to invasion. Where a longer time has elapsed, a simple "curve extrapolation" of MWD resistivity back to t=0 may give a better estimate of $R_t$. Also, the final MWD pass has a higher peak value than the spherically-focused wireline log. This indicates that the short range characteristics of the MWD normal devices cause it to read closer to the flushed zone resistivity, $R_{xo}$. Thus, a single sensor, when used in an MWD relog mode can generate the range of apparent resistivity measurements from $R_t$ to $R_{xo}$ as a function of time.

Having established, from the data of FIG. 2, that MWD relogging generates time dependent information about invasion, the method of the present invention now proceeds to the steps for analyzing that information to obtain a reliable permeability parameter.

The apparent resistivity, as seen by the MWD sensor, will change with respect to time if:
 the zone being measured is porous and permeable,
 the invasion fluid (filtrate) resistivity differs from that of the formation fluid, and
 the borehole pressure exceeds the formation pressure.
To simplify the basis for evaluation of formation invasion, it is assumed that the invasion is of a single-phase fluid of uniform viscosity flowing radially outward from the borehole into a porous and permeable formation. Under these conditions, Darcy's relationship for single phase fluid flow states that the flow rate will be proportional to the formation permeability and the pressure differential and inversely proportional to the fluid viscosities.

In looking at the sequence of relogs in FIG. 2, as a function of time, it can be seen that there is a smooth transition from a reading that is close to $R_t$ to one that will approximate $R_{xo}$, if sufficient time has elapsed (i.e., enough time for the invasion process to be completed within the range of the sensor). ("Sufficient" time will be discussed in more detail below). Since the same sensor is used for all the measurements and the borehole conditions have remained about the same, the changes in formation resistivity must result from the movement of mud filtrate from the borehole into the porous and permeable formation. In the absence of formation damage, the principal change will be the replacement of the connate water with mud filtrate.

In attempting to model this process, it is assumed that the formation resistivity will vary between two limits, $R(t_o)$ (unperturbed) and $R(\infty)$ (the final measurement), which will depend on the fluid resistivities of the connate fluid ($R_w$) and the mud filtrate ($R_{mf}$) and the formation porosity ($\phi$). It is necessary to account for the differences in these endpoint parameters in order to measure a rate of invasion. This rate will be proportional to the difference between the borehole pressure ($P_{bh}$) and the formation pressure ($P_f$), proportional to the permeability (k) and inversely related to the mud filtrate and connate fluid viscosities. Of these, it is assumed that only the pressure difference may undergo significant change with time.

It is further assumed that the initial invasion by mud filtrate does not completely displace the connate fluid in all the pores. Once the invasion front passes a radial zone, the filtrate will then diffuse by tortuous paths into the surrounding pores. Under these conditions, after an initial abrupt change in resistivity, the transition should be approximately exponential. This assumption ignores the fact that a diffusion equation solution cylindrical coordinates is not a pure exponential, and the fact that the apparent resistivity is a weighted integral over the range of the sensor. It is expected, however, that the exponential behavior will dominate, and the test data verify this conclusion.

On the basis of the previous assumption, we can write the apparent formation resistivity (after borehole correction) at any time t, R(t), as a function of the initial and final measured resistivities, $R(t_o)$ and $R(\infty)$, as follows:

$$R(t) - R(\infty) = (R(t_o) - R(\infty)) \exp[-A \cdot f(t)] \qquad (1)$$

(where A is a constant related to fluid viscosities). According to the assumptions above, f(t), the time-dependent part of the equation, will depend on the permeability, the pressure differential and the viscosities of the fluids (assumed constant). It will be a time integrated function to reflect the fact that the response at any time is a weighted volume integral. An invasion fraction, F(t) can be defined as follows:

$$F(t) = \frac{R(t) - R(\infty)}{R(t_o) - R(\infty)} = \exp - A' \cdot k \cdot \int_{t'-t_o}^{t} (P_{bh}(t') - P_f) dt' \quad (2)$$

where $A'$ is a proportionality constant related inversely to the viscosities of the drilling fluid and the connate fluid, and k is a permeability of the formation. If the borehole pressure, $P_{bh}$, is assumed constant, equation (2) can be rewritten as $$F(t) = \frac{R(t) - R(\infty)}{R(t_o) - R(\infty)} = \exp - A' k (P_{bh} - P_f)(t - t_o) \quad (3)$$

Thus, if a plot were made of F(t) |vs. time on a semilogarithmic scale, the slope, after an initial surge, would be proportional to the permeability. Furthermore, since the effects of porosity and connate fluid resistivity are normalized out on the left hand side of equation (3), all formations of the same permeability should be on the same line. An alternate method is to plot $|R(t) - R(\infty)|$ vs. time. In this case, formations of equal permeability will lie on parallel lines.

In order to plot these curves, it is necessary to have a value of $R(\infty)$, that is, it is necessary to allow sufficient time for the invasion process to be complete within the range of the sensor. "Sufficient" time can be defined as that time after which repeated logs show no further change; the last reading will correspond to $R(\infty)$. This will cause a slight problem because a value of zero cannot be plotted on a semilogarithmic scale. Be choosing a value for $R(\infty)$ slightly beyond the last point, this problem can be avoided.

In cases where the resistivity is changing even at the last relog, and if a reliable estimate of $R_w$ can be obtained from other data, $R(\infty)$ can be estimated from the equation $$R(\infty)/R(t_o) = R_{mf}/R_w \quad (4)$$

It can, thus, be seen from equations (1)-(4) and the related discussion, that the present invention presents a method for determining a permeability parameter of the formation under investigation. This permeability parameter is easily obtained by MWD resistivity relogging; and it is accurate, reliable, and easy to derive. It should be noted that the method derives a permeability parameter which is not an absolute value of porosity, but is, rather, a comparative or relative measure of permeability. Nevertheless, the permeability parameter provides valuable information about the formation. However, if the viscocity and pressure of the connate fluid are known (as from wells in the area), and since the drilling fluid viscosity and pressure are known, the absolute value of permeability can be determined from the foregoing equations and analyses.

Figure 4:
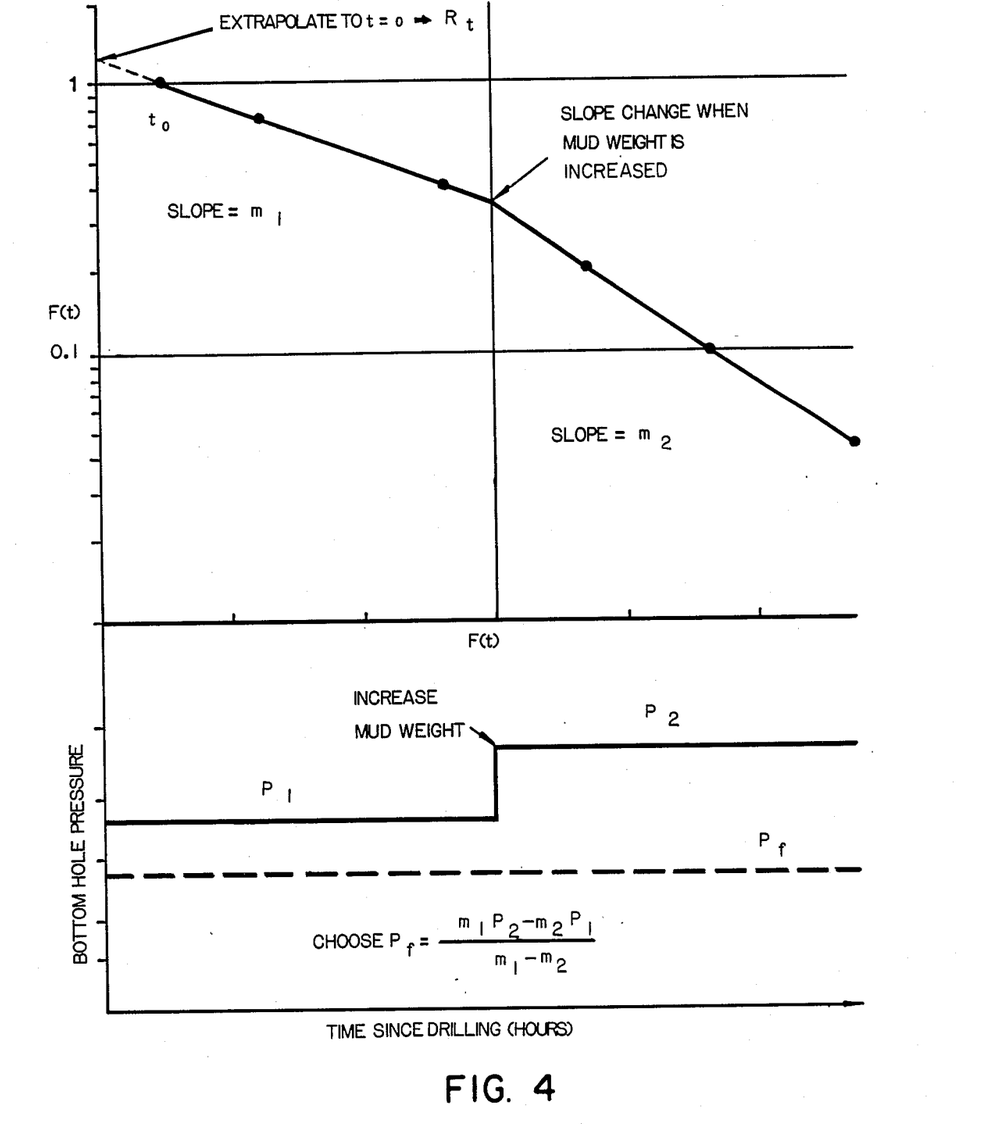
FIG. 4 shows a plot of the parameter F(t) (invasion factor) vs. time.

Further applications of the method of the present invention can be seen by referring to FIG. 4, which is an idealized plot of equation (3). (A plot of a change in borehole pressure vs. time is also shown in FIG. 4). In certain cases, there may be a significant change in the borehole pressure, as when mud weight is increased. According to equation (3), this will cause a change in slope of the curve. If $P_1$ and $P_2$ are the (constant) bottomhole pressures during the two time intervals, and $m_1$ and $m_2$ are the corresponding slopes of the curves, then:

$$M_2/m_1 = (P_2 - P_f)/(P_1 - P_f); \text{ or} \quad (5)$$

$$P_f = (m_2 P_1 - m_1 P_2)/(m_2 - m_1) \quad (6)$$

So, when mud weight is changed, the method of the present invention can give an estimate of the formation pressure. The estimate will be most reliable when the slope change is great, i e., when the original conditions were close to balance, or the weight change is signficant when compared to the differential.

Furthermore, once the relog resistivities cease to change, Archie's equation may be used to estimate the effective porosity when $R_{mf}$ is known or can be estimated.

Figure 5:
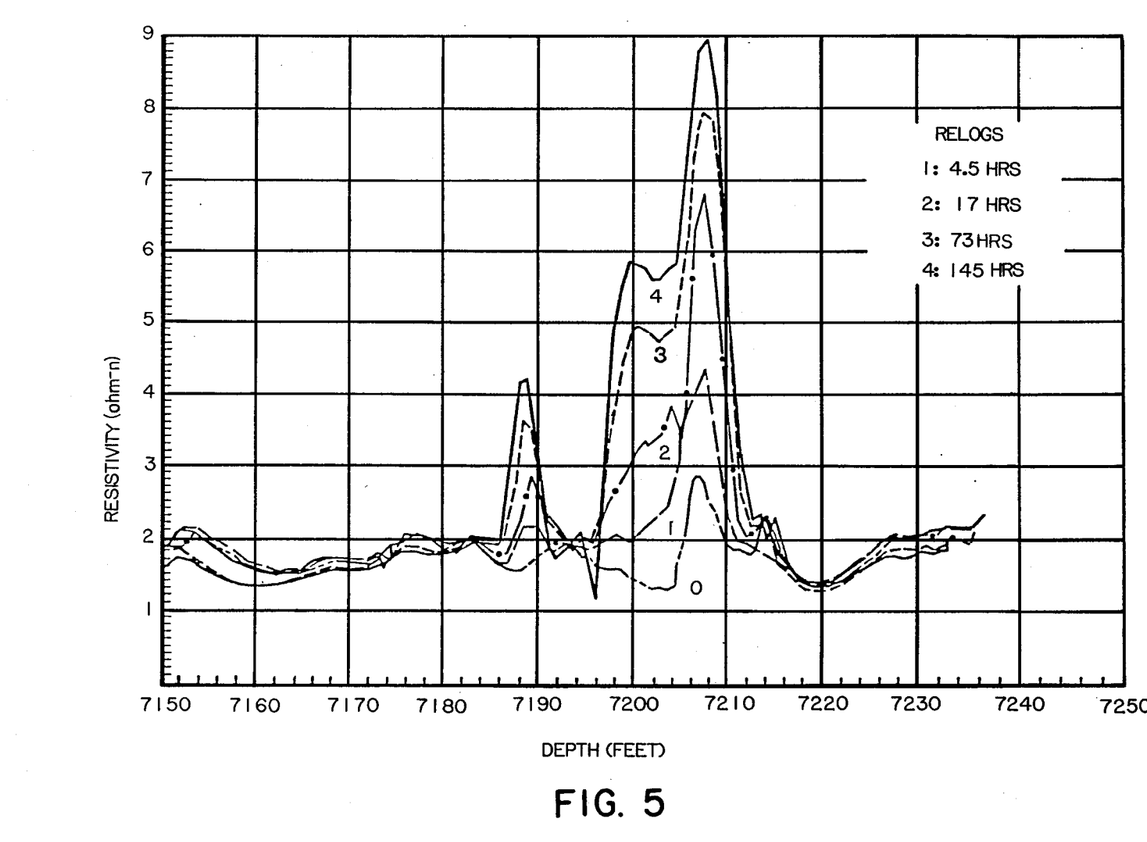
FIG. 5 is a chart showing fluid invasion profiles for a second borehole obtained using MWD logging and relogging in accordance with the present invention.
Figure 6:
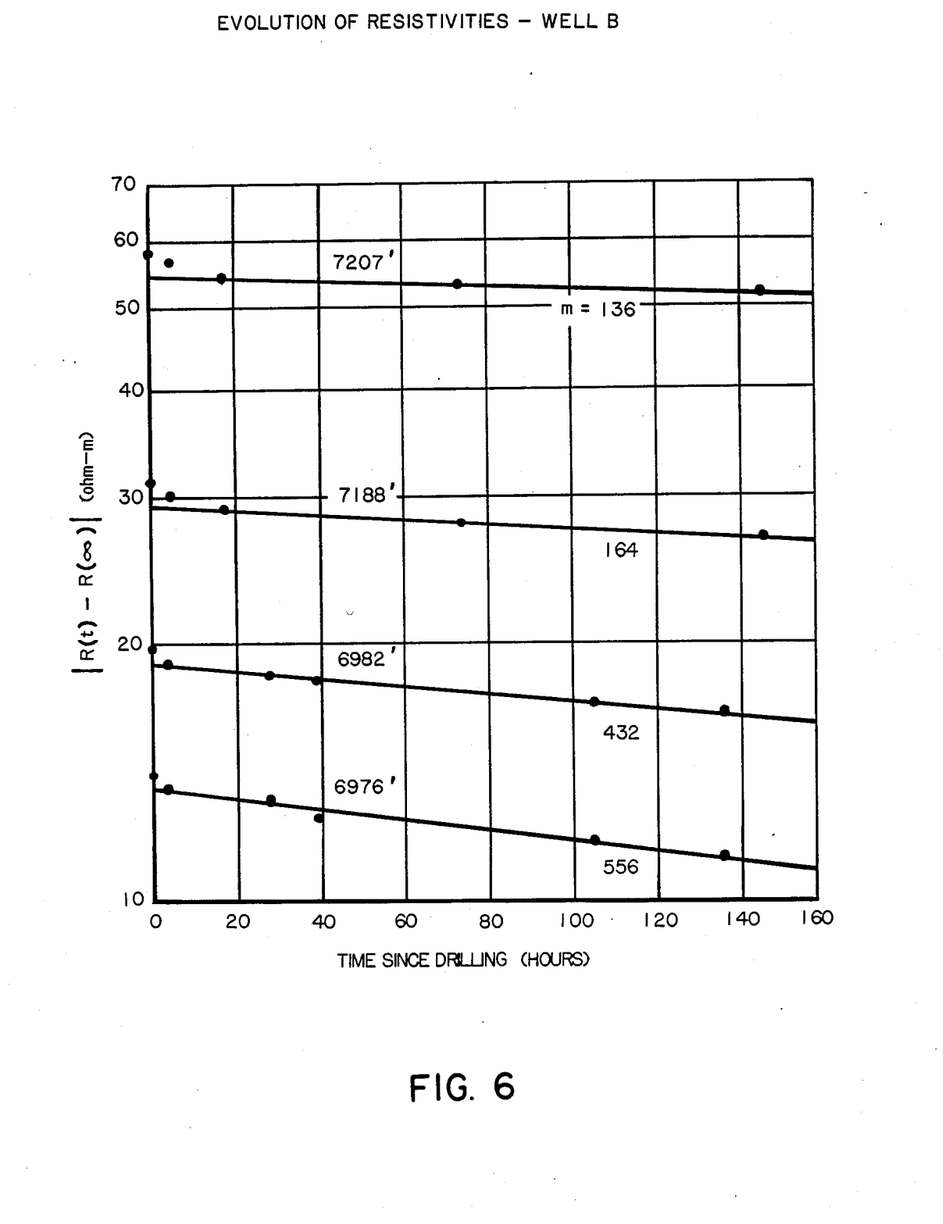
FIG. 6 is a plot of the parameter $|R(t)-R(\infty)|$ vs. time.
Figure 7:
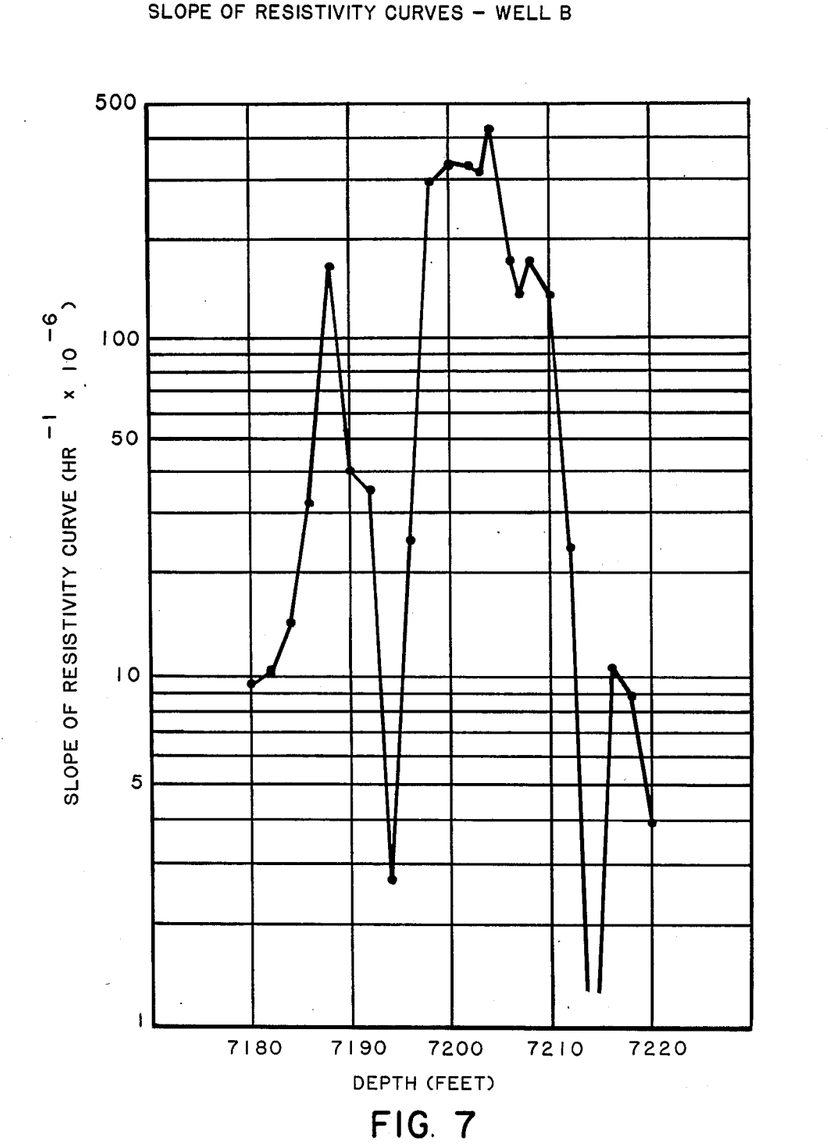
FIG. 7 is a plot of the slope of resistivity curves of the second borehole over the depth zone of interest in FIG. 5.

Referring now to FIGS. 5, 6 and 7, another example is presented of the application of the method of the present invention.

FIG. 5 shows the relogs of one zone from Well B. As in the data from Well A, there are sections of the log which show extensive changes in resistivity (corresponding to a sand zone), and some which show almost none (corresponding to shale zones). In this case, since the sand zone resistivities are still changing even at the last relog, $R(\infty)$ was estimated from equation (4), using $R_{mf} = 1.05$ and $R_w = 0.05$.

FIG. 6 shows a plot of $R(t) - R(\infty)$ for several points from Well B including some from a shallower zone. Time was used as the base of this curve because mud weights were held constant. All of the curves show the expected exponential behavior, but with different slopes. All of the curves also show a much steeper slope for the first few hours, which is consistent with the assumption of the diffusive nature of invasion.

A plot of the slopes of the resistivity curves as a function of depth over the zone of interest is shown in FIG. 7. To eliminate the fast initial invasion, the slope is taken beginning with the second relog. As expected from looking at the raw data (FIG. 5) there is a wide range in the slopes, with permeable sands separated by impermeable stringers. Note that although the resistivity change at 7207', is greater than that at 7200', the latter zone appears to be more permeable; the difference is apparently a result of slightly higher shale content at 7200'.

In the absence of any quantitative data on the formation pressure, an estimate of the actual formation permeabilities cannot be derived. According to the method of the invention, however, values in FIG. 7 are proportional to the permeabilities.

As can readily be understood by those skilled in the art from the foregoing discussion, the method of the present invention presents a simple way to achieve a reliable permeability parameter of desired formation zones through the use of an MWD relogging technique and processing of data thus obtained. The method of the invention makes it possible, for the first time, to obtain reliable data about rate of invasion and formation permeability, and thus makes an important contribution to the art of borehole logging.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for determining a permeability parameter for a formation, including the steps of:
   taking a first resistivity measurement of a zone of a formation within a short and known time after drilling of a borehole in the zone has occurred;
   taking a plurality of resistivity measurements of said zone subsequent to said first measurement to obtain incremental data of the degree of invasion of said zone by drilling fluid at the subsequent times, at least some of said subsequent measurements being taken prior to the zone being flushed;
   determining an invasion factor F(t), said invasion factor F(t) being proportional to said degree of invasion of said zone by said drilling fluid, where:

$$F(t) = \frac{R(t) - R(\infty)}{R(t_o) - R(\infty)},$$

where
   R(t) is formation resistivity at time (t),
   T(t$_o$) is the initial or unperturbed formation resistivity, and
   R(∞) is the final or flushe formation resistivity
   determining a permeability parameter of said zone from said resistivity measurements wherein the step of determining a permeability parameter includes;
   plotting F(t) versus time to determine the permeability parameter from the slope of the plot.

2. The method of claim 1 wherein:
   said first resistivity measurement is taken prior to any significant invasion of said zone by said drilling fluid.

3. The method of claim 1 wherein:
   at least one of said resistivity measurments is taken after the resistivity in said zone ceases to change due to effects of invasion of the drilling fluid.

4. The method of claim 2 wherein:
   at least one of said resistivity measurments is taken after the resistivity in said zone ceases to change due to effects of invasion of the drilling fluid.

5. The method of claim 1 including:
   plotting F(t) versus time on a semilogarithmic scale.

6. The method of claim 1 including:
   determining formation pressure from changes in the slope of said plot which are commensurate with changes in the borehole pressure.

7. The method of claim 1 including:
   determining an absolute value of permeability from said permeability parameters and from the viscosities and pressures of the drilling fluid and the formation fluid.

8. The method of claim 1 wherein:
   said first resistivity measurement is taken while drilling the borehole, and said subsequent resistivity measurements are taken at know times after said first measurement.

9. A method for determining an invasion parameter of a formation including the steps of:
   taking a first resistivity measurement of a zone of a formation within a short and known time after drilling of a borehole in the zone has occurred and prior to any significant invasion of that zone by the drilling fluid or the liquid portion thereof;
   taking a plurality of resistivity measurements of the zone at known times subsequent to said first measurement, at least some of said subsequent measurements being taken prior to the zone being flushed, and at least one of said subsequent measurements, R(∞), being taken after the zone is completely flushed by the drilling fluid; and
   determining an invasion parameter, F(t), which is proportional to the difference between the resistivity measured at a time t after drilling, R(t), and the resistivity measured after the zone is completely flushed, R(∞), said invasion parameter, F(t), being determined from the said measurements of R(t) and R(x).

10. The method of claim 9 wherein the invasion parameter F(t) is determined by the equation:

$$F(t) = \frac{R(t) - R(\infty)}{R(t_o) - R(\infty)},$$

where R(t$_o$) is the first resistivity measurement, taken before significant invasion has occurred.

11. The method of claim 9 wherein the resistivity of the zone after flushing, R(∞), is determined by the equation:

$$R(\infty) = R(to) \times Rmf/Rw$$

where
   Rmf is the resistivity of the drilling fluid filtrate, and
   Rw is the resistivity of the connate water in the formation.

12. The method of claim 9 including the step of:
   determining a permeability parameter of a zone a formation by plotting F(t) as a function of time.

13. The method of claim 12 including:
   plotting F(t) versus time on a semi-logarithmic scale to determine the permeability parameter from the slope of the plot.

14. The method of claim 13 including;
   determining the formation pressure from changes in the slope of said plot which are commensurate with changes in the borehole pressure.

15. The method of claim 13 including:
   determining an absolute value of permeability from said permeability parameter and from the viscosities and pressures of the drilling fluid and the formation.

16. The method of claim 9 wherein:
   said first resistivity measurement is taken while drilling the borehole.

17. The method of claim 16 including the step of:
   determining a permeability parameter of a zone of a formation by plotting F(t) as a function of time.

18. The method of claim 17 including:
   plotting F(t) versus time on a semi-logarithmic scale to determine the permeability parameter from the slope of the plot.

19. The method of claim 18 including;
   determining the formation pressure from changes in the slope of said plot which are commensurate with changes in the borehole pressure.

20. The method of claim 18 including:
   determining an absolute value of permeability from said permeability parameter and from the viscosities and pressures of the drilling fluid and the formation.

21. A method for determining a permeability parameter of a formation, including the steps of:
taking a first resistivity measurement of a zone of a formation within a short and known time after drilling of a borehole in the zone has occurred and prior to any significant invasion of that zone by the drilling fluid or the liquid portion thereof;
taking a plurality of resistivity measurements of the zone at known times subsequent to said first measurment, at last some of said subsequent measurements being taken prior to the zone being flushed, and at least one of said subsequent measurements, $R(\infty)$, being taken after the zone is completely flushed by the drilling fluid;
determining an invasion factor, F(t), which is proportional to the difference between the resistivity measured at a time t after drilling, R(t), and the resistivity measured after the zone is completely flushed, $R(\infty)$; and
determining a permeability parameter of the zone from said resistivity measurements by plotting F(t) versus time to determine the permeability parameter from the slope of the plot.

22. The method of claim 21 wherein the invasion parameter F(t) is determined by the equation:

$$F(t) = \frac{R(t) - R(\infty)}{R(t_o) - R(\infty)},$$

where $R(t_o)$ is the first resistivity measurement, taken before significant invasion has occurred.

23. The method of claim 21 wherein the resistivity of the zone after flushing, $R(\infty)$, is determined by the equation:

$$R(\infty) = R(t_o) \times Rmf/Rw$$

where
Rmf is the resistivity of the drilling fluid filtrate, and
Rw is the resistivity of the connate water in the formation.

24. The method of claim 21 including:
plotting F(t) versus time on a semi-logarithmic scale to determine the permeability parameter from the slope of the plot.

25. The method of claim 24 including;
determining the formation pressure from changes in the slope of said plot which are commensurate with changes in the borehole pressure.

26. The method of claim 24 including:
determining an absolute value of permeability from said permeability parameter and from the viscosities and pressures of the drilling fluid and the formation.

27. The method of claim 21 wherein:
said first resistivity measurement is taken while drilling the borehole.

* * * * *